United States Patent [19]

Johnson

[11] 4,357,627
[45] Nov. 2, 1982

[54] METHOD AND APPARATUS FOR IMPROVING RESOLUTION OF SCOPHONY SCANNING SYSTEM UTILIZING CARRIER PHASE REVERSAL

[75] Inventor: Richard V. Johnson, Pasadena, Calif.

[73] Assignee: Xerox Corporation, Stamford, Conn.

[21] Appl. No.: 144,759

[22] Filed: Apr. 28, 1980

[51] Int. Cl.³ .............................................. H04N 5/76
[52] U.S. Cl. .................................... 358/348; 346/108; 358/302; 358/300; 358/296; 358/335
[58] Field of Search .................... 360/34, 32; 358/286, 358/296, 127, 128.5, 300, 302, 132, 285, 199, 201, 235; 179/100.1 G, 100.3 V; 346/108; 369/59, 124

[56] References Cited

U.S. PATENT DOCUMENTS

| | | | |
|---|---|---|---|
| 3,391,255 | 7/1968 | Gregg | 179/100.3 V |
| 3,403,231 | 9/1968 | Slaton | 360/34 |
| 3,514,534 | 5/1970 | Korpel | 358/201 |
| 3,922,485 | 11/1975 | Starkweather | 350/6.8 |
| 3,938,881 | 2/1976 | Biegelsen | 310/313 B |
| 4,170,028 | 10/1979 | DeBenedictis | 358/285 |
| 4,205,350 | 5/1980 | Gunning | 358/296 |
| 4,213,158 | 7/1980 | DeBenedictis | 358/128.5 |

OTHER PUBLICATIONS

"The Supersonic Light Control and its Application to Television with Special Reference to the Scophony Television Receiver", Proceedings of the I.R.E., vol. 27, pp. 483–486, Aug. 1939, by Robinson.

*Primary Examiner*—Bernard Konick
*Assistant Examiner*—Alan Faber
*Attorney, Agent, or Firm*—Franklyn C. Weiss

[57] ABSTRACT

An optical data recording system in which during recording the image of the acoustic pulse at the writing surface is made to move at the same relative velocity with respect to the recording medium whereby motion blur is minimized or reduced. The writing beam, such as that generated by a laser, is incident on acousto-optic device (such as a Bragg cell) and may be diffracted (deflected) at an angle determined by the frequency of a source applied to the device. By selecting the system magnification between the device and the recording medium such that the magnification, in one embodiment, is substantially equal to the ratio of the velocity of the recording medium to the velocity of the sound wave in the acousto-optic device; the image of the acoustic pulse follows the surface of the recording medium and permits imaging of the video signal to the recording medium without blurring. In a second embodiment wherein the writing beam is scanned across the surface of the recording medium, the system magnification is selected to be substantially equal to the ratio of the velocity of the writing beam to the velocity of the sound wave in the acousto-optic device. System resolution is substantially improved by reversing the video digital bit stream which is applied to a balanced diode mixer in the modulator driver electronics thereby shifting the acoustic carrier signal phase by 180° which in turn induces a 180° phase shift in the light scattered by that video pulse. The present invention also allows a glass modulator to be utilized at relatively high video rates (i.e., in the range of 55 M bit/sec.) rather than currently utilized TeO₂ modulators which are much more expensive.

11 Claims, 20 Drawing Figures

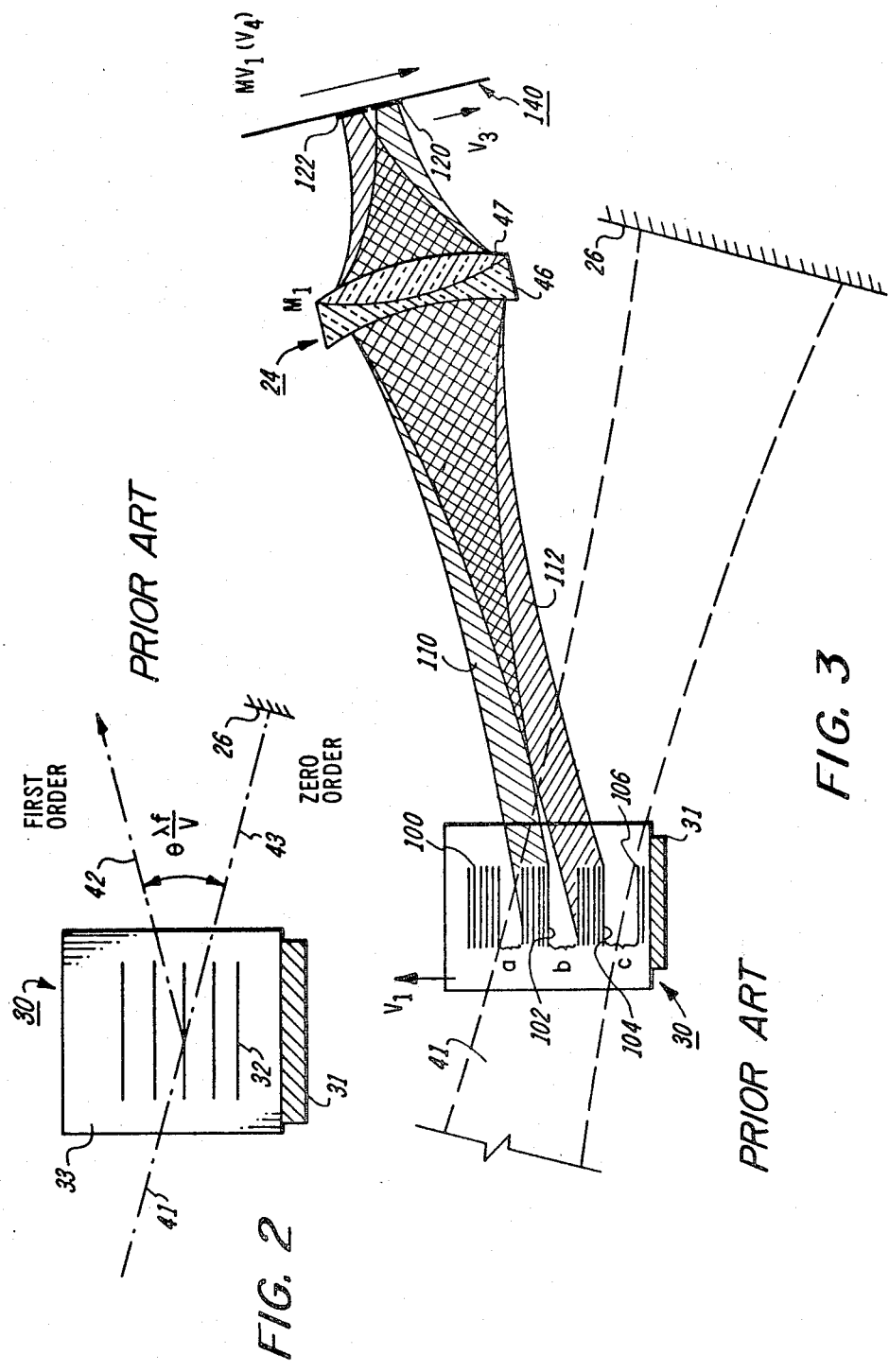

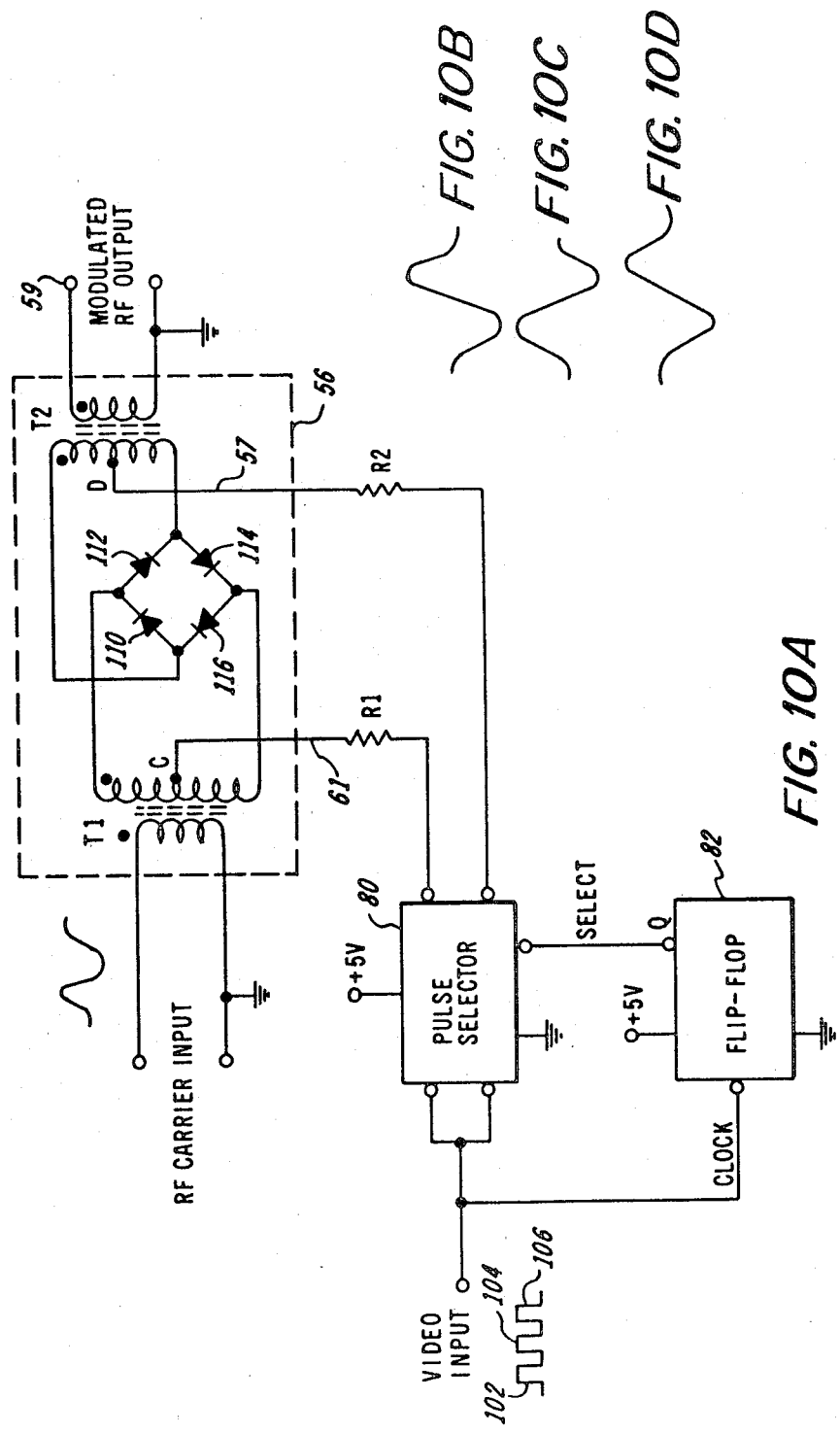

METHOD AND APPARATUS FOR IMPROVING RESOLUTION OF SCOPHONY SCANNING SYSTEM UTILIZING CARRIER PHASE REVERSAL

BACKGROUND OF THE INVENTION

Acousto-optic modulators have been utilized in prior art optical recorders for recording information on recording mediums sensitive to laser flux as shown, for example, in U.S. Pat. No. 3,922,485. In particular, this patent discloses a multifaceted polygon optical scanner which scans a modulated laser beam across a xerographic medium. The beam may be modulated by an acousto-optic modulator which is driven by a system which has, as one input, video input information which is to be reproduced. A motion blur problem can arise in those forms of optical data recorders in which there is significant relative movement between the recording medium and the focused writing beam. Reduction of motion blur by the use of very fast electro-optic modulators is possible, but that technique tends to be rather costly. State-of-the-art acousto-optic modulators are not effective in many potential applications because of the practical limitations in the rise time of the modulator which is imposed by the transit time of the acoustic wave front across the laser beam, thereby reducing or severely limiting the response of the modulator to high speed input video information.

Korpel U.S. Pat. No. 3,514,534 discloses a laser modulating and scanning system which utilizes a pair of acousto-optic devices to modulate and deflect a laser beam across an image screen. By positioning the acousto-optic devices apart a predetermined distance, a visible replica of the video information to be reproduced is formed in a manner such that the picture elements are immobilized on the screen.

An article by D. M. Robinson, "The Supersonic Light Control and its Application to Television with Special Reference to the Scophony Television Receiver", proceedings of the I.R.E., Vol. 27, pp. 483–486, August, 1939, discloses a system where a sound wave carries with it a replica of the video signal received during an immediately proceeding time interval and which is projected on a screen, a mirror polygon being utilized to move the whole image across the screen at the same speed in the opposite direction to immobilize the details on the screen.

A technique for providing a replica of the video signal carried by a sound wave to an optical recording system which utilizes rotating devices, such as a xerographic drum or an optical disc, as the reproduction medium and a simplified technique for immobilizing the image of the acoustic pulse at discrete areas at the writing surface to minimize image blur is disclosed in co-pending Application Ser. No. 920,314, filed June 28, 1978 now U.S. Pat. No. 4,213,158 and assigned to the assignee of the present invention. Although the technique described therein is satisfactory for most purposes, the frequency response thereof is limited. What is desired, therefore, is the high resolution system described in the aforementioned copending application which has an extended frequency response.

An improved Scophony system for processing band-limited analog video signals is disclosed in copending Application Ser. No. 27,342, filed Apr. 5, 1979, now U.S. Pat. No. 4,253,725, and assigned to the assignee of the present invention. In accordance with the invention disclosed therein, a light profile of increased frequency is passed by the deflector of a Scophony scanner system by decentering the optical alignment of the system so that the light profile falls just within one edge of the deflector window. One advantage of this decentering of the optical alignment is an increased frequency response by the system due to transmission of only one sideband of the light profile, which in terms of a printing system, means increased resolution. However, this system is not responsive to a video binary digital bit stream which is the format utilized in many printers, including laser printers, and therefore has limited use in printer applications.

SUMMARY OF THE PRESENT INVENTION

The present invention provides a method for substantially reducing the bandwidth and rise time limitations associated with the use of state-of-the-art acousto-optic modulators in an optical data recording system by reimaging the motion of the acousto-optic pulse onto a recording medium thereby greatly increasing the effective bandwidth of the acousto-optic modulator and reducing any blurring of the image formed on the surface of the recording medium. In particular, the laser beam incident on the acousto-optic modulator may be diffracted, the diffracted beam being incident on the recording medium. By selecting the system magnification between the modulator and the recording medium to be substantially equal to the ratio of the surface velocity of the recording medium, in a first embodiment when the writing beam is fixed as it scans across the recording medium, to the velocity of the acoustic wave front in the acousto-optic modulator, the acoustic pulse (which essentially contains the video information) is reimaged onto the surface of the recording medium in a manner whereby the acoustic pulse follows the recording surface and permits an isomorphic mapping of the video signal to the recording medium without blurring. In a second embodiment wherein the writing beam is deflected in a scanning motion across the surface of the recording medium, the system magnification is selected to be substantially equal to the ratio of the velocity of the moving laser beam to the velocity of the sound wave in the acousto-optic modulator. System resolution is substantially improved by reversing the video digital bit stream which is applied to a balance diode mixer in the modulator driver electronics thereby shifting the acoustic carrier signal phase by 180° which in turn induces a 180° phase shift in the light scattered by that video pulse. The present invention also allows a glass modulator to be utilized at relatively high video rates (i.e., in the range of 55M bit/sec.) rather than currently utilized $TeO_2$ modulators which are much more expensive. Further, the present invention utilizes the capability of an acousto-optic Bragg cell to modulate the spatial profile of an incident light beam (in addition to its well-known capability to modulate in time the power of the light beam) to minimize image blur by tracking the surface of the recording medium with a moving image of the video signal stream.

It is an object of the present invention to provide an improved optical data recording system.

It is an object of the invention to provide a scanning system which incorporates an acousto-optic modulator, the acousto-optic modulator being operated in a manner in which the bandwidth requirements of the modulator are substantially reduced.

It is a further object of the present invention to provide a technique for utilization of an acousto-optic modulator in a laser scanning system wherein the bandwidth requirements of the modulator are substantially reduced.

It is still a further object of the present invention to provide a pulse imaging technique for use in a laser beam writing system wherein the laser beam incident on the acousto-optic modulator interacts with the acoustic pulse, the laser output beam being projected onto a recording surface. Proper selection of the system magnification between the modulator and the recording surface provides a pulse image on the recording surface, the relative velocity of the pulse image with respect to the velocity at the recording surface being substantially zero thereby minimizing image blurring on the surface of the recording medium. System resolution is substantially improved by reversing the video digital bit stream which is applied to a balanced diode mixer in the modulator driver electronics thereby shifting the acoustic carrier signal phase by 180° which in turn induces a 180° phase shift in the light scattered by that video pulse. The present invention also allows a glass modulator to be utilized at relatively high video rates (i.e., in the range of 55 M bit/sec.) rather than currently utilized $TeO_2$ modulators which are much more expensive.

DESCRIPTION OF THE DRAWINGS

For a better understanding of the invention, as well as other objects and features thereof, reference is made to the following description which is to be read in conjunction with the accompanying drawings wherein:

FIG. 2 is a schematic diagram of the active optical element used in the present invention;

FIG. 3 shows in a simplified representation of the present invention wherein, in the case illustrated, two acoustic pulses are illuminated by an input laser beam and imaged onto an optical data recording surface;

FIGS. 7A1 to 7A3 and FIGS. 7B1 to 7B3 show the electrical/optical signal relationship with and without polarity reversal, respectively;

FIG. 10A is a circuit diagram for providing phase reversal of the acoustic carrier frequency for successive video pulses, with FIGS. 10B to 10D being signal representations helpful in understanding the operation of FIG. 10A.

DESCRIPTION OF THE PREFERRED EMBODIMENTS

Figure 1:
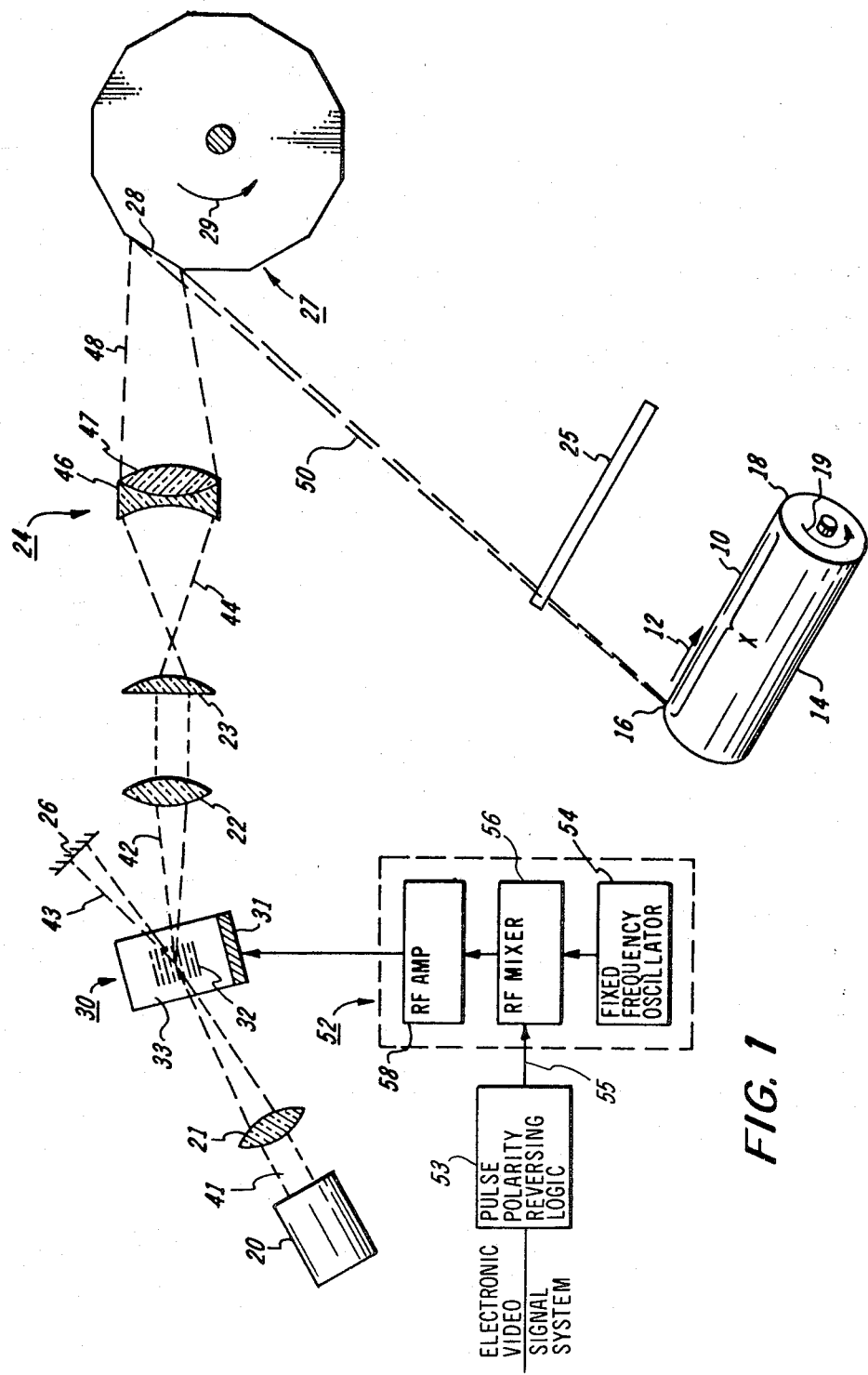
FIG. 1 is a partial schematic diagram of one embodiment of the optical scanning system which may be utilized in the present invention at the start of scan position.

Referring now to FIG. 1, a partial schematic diagram of an optical scanning system in which the teachings of the present invention are incorporated is illustrated. The optical portion of the schematic diagram shows the scanning system at the beginning of a scan line 10, the scan line 10 being in the direction of arrow 12 along the surface of a medium 14 which is sensitive to the laser flux utilized in the system. It is assumed that the scan line 10 starts at point 16 on the surface of medium 14, the scan line 10 being along a width x; i.e., from point 16 to point 18. As shown, medium 14 is preferably a xerographic drum which is rotated in the direction of arrow 19 to provide the Y direction of scan. It should be noted at this point that the recording medium may be an optical disc with the writing laser beam directly incident on the optical disc without the necessity of a scanning polygon. A light source 20 provides the original light beam 41 for utilization by the scanning system. The light source 20 generates a collimated beam of light and preferably comprises a laser, such as a helium-cadmium or helium-neon laser. The laser which generates a collimated beam of monochromatic light may easily be modulated by an active optical element, acousto-optic modulator 30, in conformance with the information contained in a video signal applied to the modulator controller as will be set forth hereinafter. A lens 21 is provided to focus the beam 41 onto the modulator 30.

FIG. 2 illustrates in schematic form the active optical element which may be used in the present invention. The element 30 is an acousto-optic Bragg cell or, as it is more commonly called, an acousto-optic modulator (hereinafter referred to as modulator). The modulator 30 comprises an electrically driven piezoelectric transducer 31, such as lithium niobate, bonded to an acousto-optic material 33 which may be glass, plastic, or crystal such as a single tellurium dioxide ($TeO_2$) crystal. The transducer 31 in response to an electrical drive signal generates an acoustic-wave which travels through the material, perturbing the index of refraction and acting as a phase grating 32, the grating period being equal to the drive or acoustic frequency. Grating density (ability of grating to modify the phase front of light beam) is proportional to the amplitude of the drive signal applied to the transducer 31. The wavefronts are segmented by the video signal characteristics, and for a video signal comprising a stream of "1"s and "0"s, it is assumed that the spacing between segmented wavefronts, is determined by the "0" time of the video signal although the "1" time can be utilized.

A beam of light 41 is applied to the modulator. Without a signal applied to the transducer 31, only a non-diffracted output beam 43 exists. Application of a signal to the transducer from a fixed frequency oscillator 54 produces two significant output beams, a first-order diffracted beam 42 and a zero-order non-diffracted beam 43. In the present invention, the first-order beam is the output, while the zero-order beam is absorbed by a beam stop 26 (the zero-order beam may be utilized as the output if desired). The intensity of the output beams is a function of the amplitude of the drive signal applied to the transducer.

An angle $\theta$ which represents the approximate angle of diffraction exists between the first-order and zero-order beams. The angle $\theta$ is directly proportional to the drive frequency f, the wavelength of the incident laser light λ and inversely proportional to the velocity of propagation V of the acoustic pulses in a modulator 30. An example of a modulator which may be used in the present invention is disclosed in U.S. Pat. No. 3,938,881.

With reference again to FIG. 1, the first-order beam 42 is positioned at the output of modulator 30 as shown, passes through a recollimating lens 22, and is then incident on cylindrical lens 23 having power in the tangential (direction of scan) direction. Cylindrical lens 23 expands beam 42 into a beam 44 which is incident on optical element 24 which has a magnification level $M_1$ associated therewith. In the embodiment shown, optical element 24 comprises two elements, a biconcave element 46 and a second convex lens 47 cemented to biconcave lens element 46. Optical element 24 is configured to form an image of the acoustic pulses in modulator 30, as set forth hereinbelow, onto the surface of the recording medium 14. Although not shown, the magnification $M_1$ of optical element 24, which also may comprise a single lens element, is selected to be variable over a predetermined range in a manner known in the optical magnification art. The elements 23 and 24 and the distance therebetween are selected such that the beam portion 48 at the output of optical element 24 is directly incident onto a facet 28 of rotating multifaceted polygon 27 and thereafter focused via cylindrical lens 25 as scan line 10 proximate the surface of recording medium 14. Facet 28 may be fully illuminated along its width by the beam 48 as shown or the beam 48 as shown or the beam 48 can be compressed to a small spot on the facet 28.

The rotational axis of polygon 27 is orthogonal or nearly orthogonal to the plane in which light beams 42 travels. The facets of polygon 27 are mirrored surfaces for the reflection of any illuminating light impinging upon them. With the rotation of the polygon 27 in the direction shown by arrow 29, light beam 48 is reflected from illuminated facet 28 and translated through a scan angle for flying spot scanning.

The beam portion 50 reflected from facet 28 passes through cylindrical lens 25 which has power only in the sagittal direction (orthogonal to the direction of scan), beam portion 50 being focused at point 16 on surface of medium 14 as shown.

The acousto-optic modulator 30 is used to modulate the light beam 41 in accordance with the information contained in the electrical video binary digital bit stream supplied to the control circuit 52 via pulse polarity reversing logic 53 (described in more detail hereinafter with reference to FIG. 10). In the control circuit, a fixed frequency oscillator 54 provides an output of constant amplitude and constant frequency which is mixed with the electrical video binary digital bit stream on lead 55 in mixer 56. The output of the mixer 56 is amplified by amplifier 58 and then used as the drive signal to the transducer 31. The output beam of the modulator 30 may be either the zero-order beam or the first-order beam, the intensity of either beam being a function of the amplitude of the drive signal applied to the transducer 31.

FIG. 3 is a simplified representation which sets forth the particular features of the present invention. In particular, the input laser beam 41 is focused onto Bragg cell 30 and the video information is impressed upon the r-f carrier which drives the travelling wave Bragg cell in a manner described hereinabove. As is well known in the art, acoustic pulses 100, 102, 104 and 106 . . . are set up in the modulator 30 corresponding to an acoustic volume phase grating, the spacing between the wavefronts being proportional to the input signal which may be a digitized scanned input, analog video signal or from a source of data, such as a computer. In the case of a binary signal the spacing between the wavefront a, b, c . . . is proportional to the duration of a "0" input signal which may in turn correspond to the printing of no information on the laser sensitive medium. In effect, the video information (video pulses $100^1$, $102^1$ . . . correspond to the acoustic pulses 100, 102 . . .) is transformed into coded segments of the acoustic volume phase grating produced by the data, or video, modulated RF carrier signal. Modulator 30 is orientated with respect to other system elements (such as folding mirrors which are not shown) so that the acoustic field travels in the proper direction with respect to the surface of the recording medium. In the case of the FIG. 1 embodiment, the acoustic field travels anti-parallel to the scan direction (or optical equivalent thereof). In other words, the acoustic field moves anti-parallel to the direction that the writing laser beam is caused to move relative to the recording medium. In the situation wherein an optical disc is utilized as the recording medium, the acoustic field travels in the same (parallel) direction as the velocity vector at the discrete area of the recording surface which is to be recorded on. Incoming video beam 41, in the case illustrated, has a sufficient width in the direction of sound propagation, indicated by the arrow labeled $V_1$, representing the sound wave velocity, to encompass two coded segments or "bits" (102 and 104) of the acoustic volume phase grating although more or less coded segments could be illuminated. The more coded segments illuminated, the better the resolution of the data recorded. Preferably, between one and two coded segments are illuminated. The coded segments 102 and 104 transform the incident laser beam 41 into separate optical beams 110 and 112, respectively, which move at the velocity of the phase grating within modulator 30. The optical element 24 is positioned relative to acousto-optic modulator 30 such that the deflected beams 110 and 112 are incident thereon and imaged as pulses 120 and 122, respectively, onto the surface of recording medium 140.

The element 140 shown in FIG. 3 represents the surface of a medium sensitive to laser flux incident thereon and may represent, for example, an optical disc or a xerographic member, such as a xerographic drum. In the case of a xerographic drum, the velocity of the recording medium 140 at the area wherein a scanning laser beam may be incident is essentially zero in the direction of scan (reference numeral 12 shown in FIG. 1). In the case wherein medium 140 is an optical disc, the velocity of the disc at the discrete area wherein the laser beam is incident (as will be described in more detail hereinafter) is substantially equal to the tangential velocity of the disc at that area.

Further details of the operation of the Scophony scanning which may be utilized in the present invention can be ascertained from the aforementioned copending Application Ser. No. 920,314, the teachings of which that are necessary for an understanding of the present invention being incorporated herein by reference.

In the case wherein an optical disc is utilized as the recording medium (shown in detail in copending application Ser. No. 920,314), the incident light beam is incident on a discrete area of a particular track of the optical disc. The use of optical disc for recording information by utilizing a laser beam impinging thereon is known in the prior art. In this configuration, the velocity of the laser beam at the surface of the optical disc is essentially fixed at the time data is to be recorded since in optical disc recording technology, the laser is generally positioned to a desired track, the laser then being energized at the appropriate time as the optical disc rotates therepast. In this case, it is required that the velocity of the optical pulses be equal to and in the same direction as the velocity of the area of the track whereat information is to be recorded. In this case, the velocity of the discrete track area is essentially equal to the tangential velocity of the disc at that discrete area of the track.

Referring to FIG. 3, and assuming that the recording medium 140 is an optical disc, each of the coded segments 102 and 104 produce corresponding optical pulses 120 and 122, respectively, the separation between the acousto-optic pulse images corresponding to the separation between the segmented coded pulses 102 and 104. In essence, the light output from modulator 30 is broken up into spatial instead of temporal segments.

Acousto-optic interaction occurring in the region of acoustic pulses 102 and 104 causes the input light to be diffracted, the undiffracted or zero order light being absorbed, in the embodiment illustrated, by zero order stop member 26. The first order diffracted light is diffracted by the moving acoustic grating to otical element 24 which projects the optical beams 110 and 112 onto medium 140 as optical pulses 120 and 122, respectively.

If the recording medium utilized is a xerographic medium as shown in FIG. 1 wherein the scanning direction is orthogonal to the direction of rotation of the drum, and if the system magnification M between the acousto-optic modulator 30 and the surface of the photoreceptor is selected such that $-MV_1=V_3$ wherein $V_1$ is the acoustic velocity in the medium 30, $V_3$ is the relative velocity of the laser scanning beam in the direction of scan (velocity effects in the direction of drum rotation are negligible) which can be measured, for example, by utilizing appropriate start and end of scan detectors, the image 120 and 122 of acoustic pulses 102 and 104, respectively, follows the velocity of the scanning beam in the opposite direction (relative velocity $MV_1$ of imaged acoustic pulses 120 and 122 with respect to the photoreceptor is substantially zero) and thereby permits an isomorphic mapping of the video signal to the surface of the recording medium with minimized blurring since the velocity of the medium in the direction of scan is substantially zero. The minus sign in front of the above relationship indicates that the optical elements between the acoustic-optic modulator 30 and the surface of the recording medium should be selected such that the pulses are travelling, in the apropriate sequence, in a direction opposite to the scanning direction. It should be noted that in the actual system, each of the optical elements may contribute to system magnification other than optical element 24. The system of the present invention is designed so that the system optical magnification is of the proper value to make pulses 120 and 122 immobilized on the surface of the recording medium. A technique to ensure that the system optical magnification, after the system has been built, is of the proper value is to monitor the contrast ratio of the recorded images while adjusting lens magnification. To exemplify the above relationship, the acoustic compressional wave velocity $V_1$ may be calculated to be approximately $4.25 \times 10^5$ cm/sec for a $TeO_2$ acoustic-optic modulator. For a scanning beam velocity of 2500 cm/sec, the system magnification between modulator 30 and the recording surface should be:

$$-M = \frac{V_3}{V_1} = \frac{2500 \text{ cm/sec}}{4.25 \times 10^5 \text{ cm/sec}} = \frac{1}{170.4}$$

Therefore, the velocity of the pulse images 120 and 122 at the recording medium surface is approximately 2500 cm/sec. It should be noted that it has been determined that the best performance of the system occurs when $V_3/V_1 = -M$ (or M for the case of the optic disc recording medium). However, it has been further determined that even if the magnification M cannot be adjusted exactly to that ratio but is within around 10% of that value, the resolution characteristics of the optical data recording system will still be imroved over the uncompensated system. This is particularly pertinent to the optical disc recording embodiment since the velocity $V_3$ utilized in the above equation is selected to correspond to the average velocity between the outermost and innermost recording tracks and one system magnification only may be provided.

As set forth hereinabove, a conventional optical memory device may be utilized as the recording medium and is comprised of a substrate disk having on one surface thereof a storage or recording medium in the form of a thin film, such as, for example, a film of bismuth on the order of 500 Å thick. During system operation, the optical memory is rotated at a constant speed by means of a drive motor. Modulated laser light beam produces a change in the optical characteristics of discrete, closely spaced portions of the recording medium thereby providing a record of the information conveyed by the data signal supplied to modulator 3.

It should be noted that the image velocity vector, which is a change of length in a unit time, can be increased or decreased linearly by the magnification factor M. Further, the magnification of an optical system can be diferent in the sagittal direction (direction orthogonal to direction of scan) and tangential direction (direction parallel to direction of scan). Since the blurring effect would be most apparent in the direction of scan, the magnification relationship set forth hereinabove is for the direction of scan.

The aforementioned copending application Ser. No.920,314 details the use of an optical disc as the recording medium, the teachings therof that are necessary for an understanding of the present invention being incorporated by reference herein.

In accordance with the teachings of the present invention, it has been recognized that the video signal information which is required at the surface of the recording medium already exists within the acousto-optic modulator. In particular, the usual perception of an acousto-optic Bragg cell is that of a device which solely modulates in time the power of a light beam. The acousto-optic Bragg cell also modulates the spatial profile of the light beam. This latter capability minimizes image blur by tracking the moving recording surface with a moving image of the video signal stream. The spatial modulation is defined by the overlap of the light beam profile with the moving acoustic video signal stream (in essence, the packets of sound energy inside the modulator consititute a series of "windows" flowing past the light beam, successively exposing various segments of the laser light profile). This modulated light profile is then imaged onto the recording surface via appropriate optical elements so that the moving segments of light travel at the same speed as the disc surface, no blur occurring since there will be no movement of the light segment with respect to the disc surface. In order for tracking to occur, the requirements set forth hereinabove must be met. The acoustic video stream does not have the required dimensional scaling but in all other respects it is a faithful reproduction of the desired video image. The scaling is corrected by imaging the acoustic pulses onto the recording surface with the appropriate magnification provided by the optical elements interposed between the acoustic-optic modulator and the surface of the recording medium.

Figure 4:
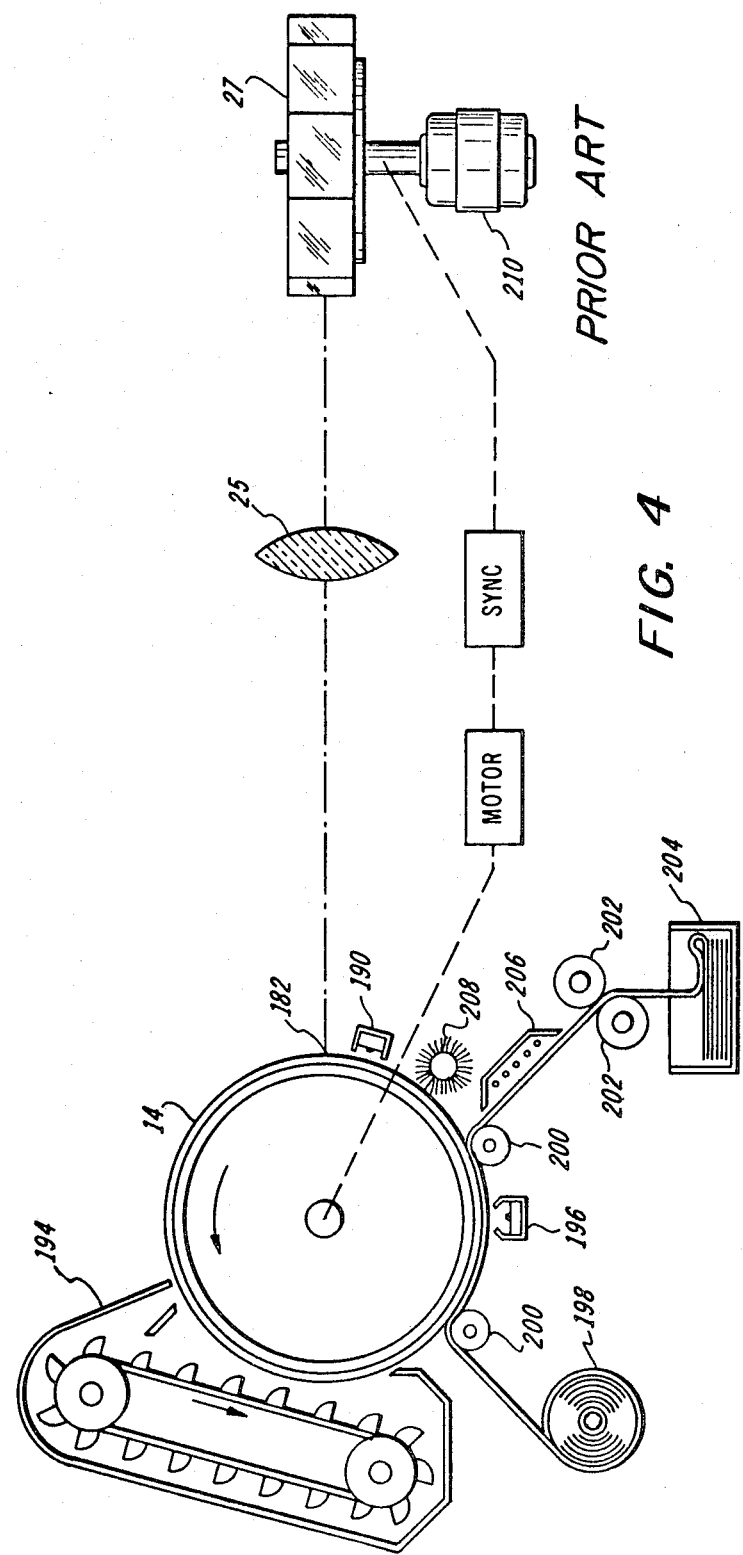
FIG. 4 shows a portion of the scanning system of the present invention shown in FIG. 1 being utilized to print information on a laser sensitive medium.

FIG. 4 shows, in more detail, the development of an image formed on a xerographic drum shown in FIG. 1. In particular, medium 10 may be a xerographic drum which rotates consecutively through a charging station depicte by corona discharge device 190, exposure station 182, where the beam from the rotating polygon 27 traverses the scan width x on the drum 14, through developing station 194 depicted by a cascade development enclosure, transfer station 196 where a web of copy paper is passed in contact with the drum 14 and receives an electrostatic discharge to induce a transfer of the developed image from the drum 14 to the copy paper. The copy paper is supplied from the supply reel 198, passes around guide rollers 200 and through driver rollers 202 into receiving bin 204. A fusing device 206 fixes the images to the copy paper as it passes to bin 204.

Usable images are provided in that the information content of the scanning spot is represented by the modulated or variant intensity of light respective to its position within the scan width x. As the spot traverses the charged surface 192 through a given scan angle, the spot dissipates the electrostatic charge in accordance with its light intensity. The electrostatic charge pattern thus produced is developed in the developing station 194 and then transferred to the final copy paper. The xerographic drum 14 is cleaned by some cleaning device such as a rotating brush 208 before being recharged by charging device 190. The polygon 27 is continuously driven by motor 210 and synchronized in rotation to a synchronization signal representative of the scan rate used to obtain the original video signal. The rotation rate of the xerograhic drum 14 determines the spacing of the scan lines. It also may be preferable to synchronize the drum 14 in some manner to the signal source to maintain image linearity.

For the reasons set forth in copending application Ser. No.920,314, the pulse imaging scanner provides a range of video signal operating frequencies wherein resolution is greatly improved over the prior art scanners and wherein its performance is at least equal to the prior art scanners at higher operating ranges.

In order to provide a better understanding of the advantages of the present invention, a review of the prior art raster output scanning (ROS) techniques is now set forth.

Figure 5:
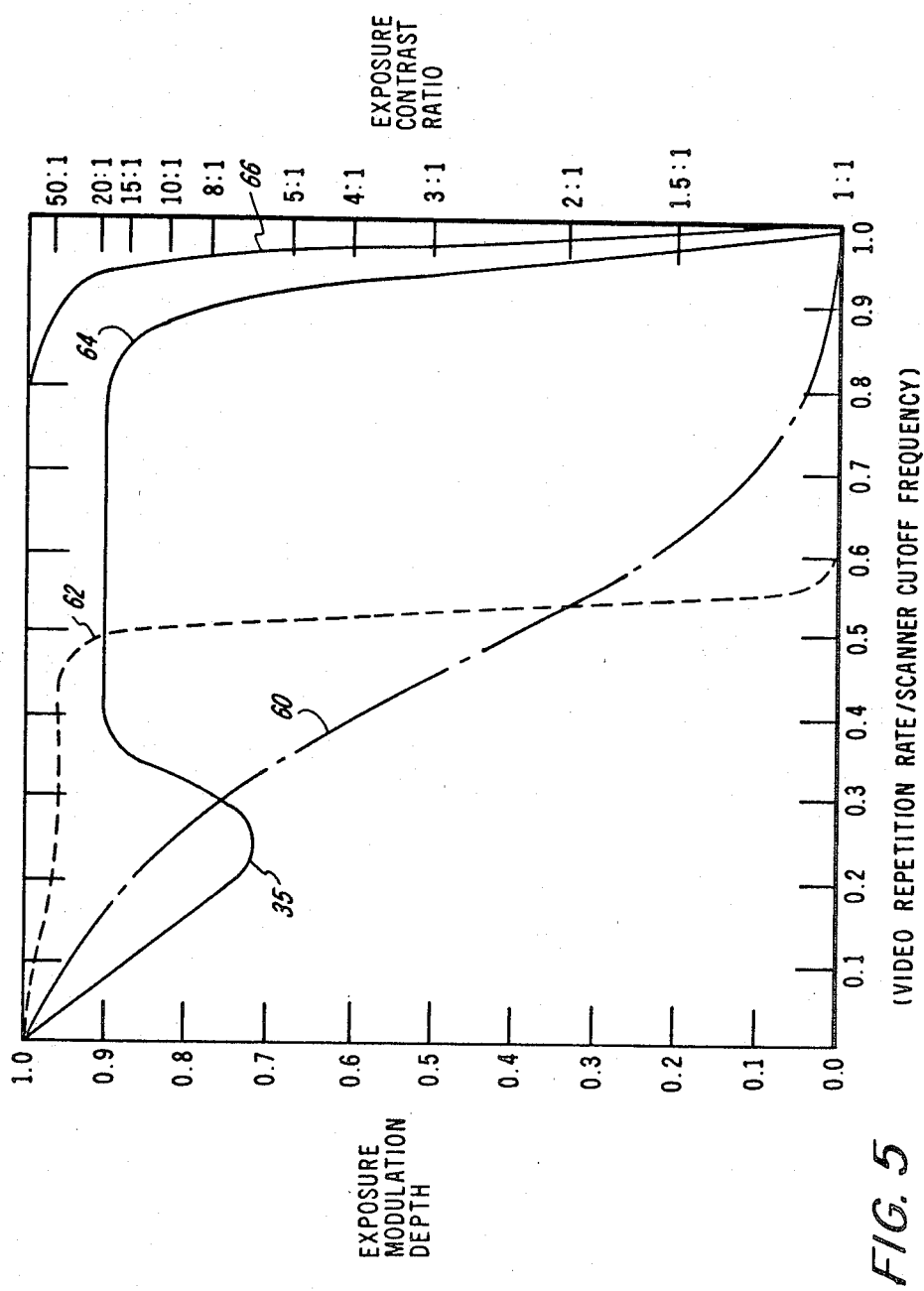
FIG. 5 is the Sayce response of four alternative ROS configurations as a function of the video pulse repetition rate.

The graph of FIG. 5 compares the resolution performance of four separate ROS optical configurations. The first ROS configuration is characterized by an overfilled polygon facet illumination, with consequent low light throughput efficiency as typified by the Xerox 9700 Electronic Printing System manufactured by Xerox Corporation, Stamford, Ct. The performance characteristic thereof is referenced by numeral 60. The second configuration is the pulse imaging ROS, as described in aforementioned copending Application Ser. No. 920,314, filed June 28, 1978, the performance of which is referenced by numeral 62. The third configuration is described in copending Application Ser. No. 27,342, the performance characteristics of which is referenced by numeral 64. The fourth configuration, the subject of the present invention, has a performance characteristic illustrated by reference numeral 66. One ordinate of the graph, exposure modulation depth, is essentially the contrast ratio at the recording surface (i.e., xerographic photoreceptor), a high modulation depth being desirable in ROS systems. The other ordinate is exposure contrast ratio (optical exposure refers to light energy per unit area; contrast ratio is the ratio of maximum to minimum otical exposure and modulation depth is given by the difference between the maximum and minimum over the sum of the maximum and minimum optical exposures).

All four configurations have an identical upper frequency limit $f_{cutoff}$ beyond which all fail to respond. This resolution cutoff point is defined by the F/number of the ROS optics along the fast scan direction (F/number relates to angle subtended by beam and is given by $$\left( F/\text{number relates to angle subtended by beam and is given by} \right.$$

$$\text{the relationship } F/\text{number} = \left.\frac{\text{Distance from Polygon Aperture}}{\text{Width of Polygon Aperture}} \right)$$

$$f_{cutoff} = v_{scan}/(\lambda F\#)$$

wherein V scan is the relative velocity of the scanning beam and $\lambda$ is the wavelength of th incident light beam.

The pulse imaging ROS configuration exhibits superior resolution peformance compared with the conventional ROS up to a sharp rolloff frequency which is approximately half of $f_{cutoff}$. Thereafter, the conventional ROS continues to respond, albeit with reduced contrast ratio, while the conventional pulse imaging ROS totally fails to respond at approximately half of f cutoff.

The single sideband (SSB) ROS (response curve 64) is a technique for extending the frequency response of the pulse imaging ROS (response curve 62). In its simplest version, this configuration, as described in copending Application Ser. No. 27,342, requires decentering the optical alignment at the polygon facet. This distorts the exposure profile, as indicated by the response dip at 35, and as exhibited even more dramatically by the edge profile shown in FIG. 9(d). This factor may be eliminated by electronically redistorting (preferably by utilizing one linear filter of a specific forma and three non-linear operations; the logarithimic transfer network, the exponential transfer network and the phase modulator) the acousto-optic modulator's drive by utilizing Power's algorithm (a well-defined technique for determining what the distorted signal should be given an appropriate input video signal and, although implementable in hardware or software is implemented in hardware due to the high data rates (i.e., 55 M b/s) utilized) described. It should be noted that the SSB system described in the copending application is limited in application to band-limited, non-negative analog video signals whereas non-bandlimited digital bit streams is the type of signal format most commonly utilized in laser printers.

The present invention relates to a relatively simple technique for processing the drive signal to the modulator in a manner such that the resolution performance advantages of the SSB ROS is achieved by a Scophony scanner system while the profile distortion inherent to the SSB configuration is avoided.

Figure 6A:
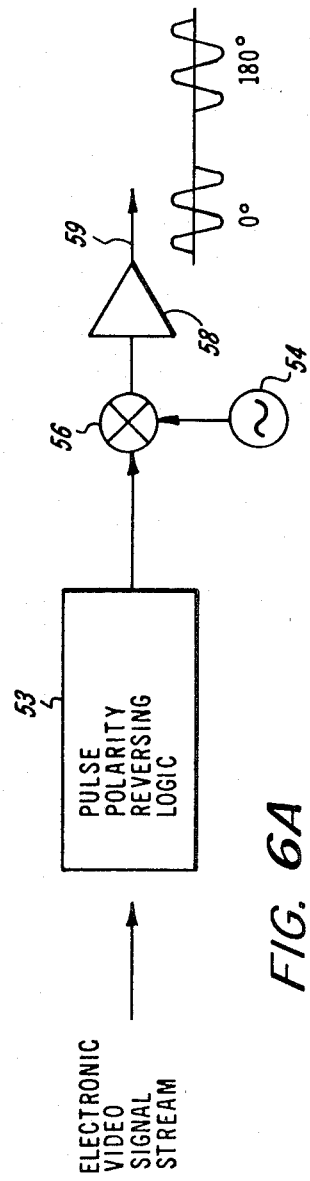
FIG. 6A is a block diagram of the modulator driver electronics, with FIGS. 6B and 6C illustrating the input and output signals of the same.
Figure 6B:
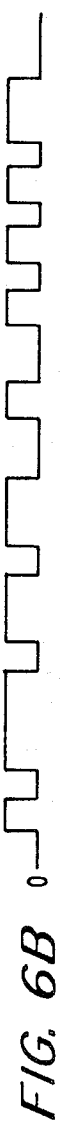
Figure 6C:

A simplified schematic of the resent invention utilizing carrier phase reversal is shown in FIG. 6. In particular, the video binary digital bit stream, generated by standard techniques including a bit map array, microprocessor, etc., and shown in FIG. 6(b), is applied to a pulse polarity reversing logic 53 which is then applied to the balanced diode mixer 56 in the modulator driver electronics, the acoustic carrier signal being shifted in phase by 180°. This induces a 180° phase shift in the light scattered by that video pulse (as compared with the light scattered by a video pulse without the voltage polarity reversal). The output from logic 53 (shown in FIG. 6(c)) is applied to one input of balanced diode mixer 56, the output of acoustic carrier oscillator 54 being applied to the other input thereof. The output of mixer 56 is applied to wideband amplifier 58, the output thereof on lead 59 being the desired modulator drive signal applied to modulator 30. The impact of this 180° phase reversal is best understood from FIG. 7. Column (a) of FIG. 7 corresponds to a pulse imaging ROS with standard (i.e., uniform polarity) modulator driver electronics. Column (b) of FIG. 7 corresponds to the identical pulse imaging ROS (with the light beam centered on the polygon facet), but with the modulator electronics modified to reverse the voltage polarity of successive video signal pulses. The top row shows the electronic video signal which is applied to the balanced diode mixer 56. The middle row shows the light amplitude profile which is imaged upon the photoreceptor by the optical system. Because of the finite size of the polygon scanner facet, which acts as a bandpass filter limiting the spatial frequency sectrum of the video signal, the pulse edges become blurred or smeared. If two adjacent pulse edges butt up closely enough, they will overlap. The bottom row shows the corresponding light intensity profile.

Referring to FIG. 5 once again, the difference between the coherent imaging repsonse of a pulse imaging ROS (curve 62) in which light amplitudes add and phase is critical, versus the incoherent imaging response of the conventional flying spot scanner (curve 60) in which light intensities add is illustrated. In the latter case, the voltage polarity reversing scheme of the present invention would be ineffective. The incoherent response is built up on a point by point basis. At any given instant in time the scan spot is focused as "hard" as possible and has a ower proportional to the electronic video signal at that instant. This spot of light energy is received by the photoreceptor and stored as energy, not amplitude. In the next instant, the scan spot moves over a short distance, the power is adjusted and another spot of light energy is applied onto the photoreceptor. There is no chance for the light profiles corresponding to the two successive instants of time to interfere coherently.

In the Scophony light valve configuration, both instants in the video signal train will be illuminated simultaneously allowing them to interfere coherently. Therefore, manipulating the phase of the modulator drive signal (which in turn controls the light profile phase) will have a substantial effect on the image performance of the scanner.

Figure 8A:
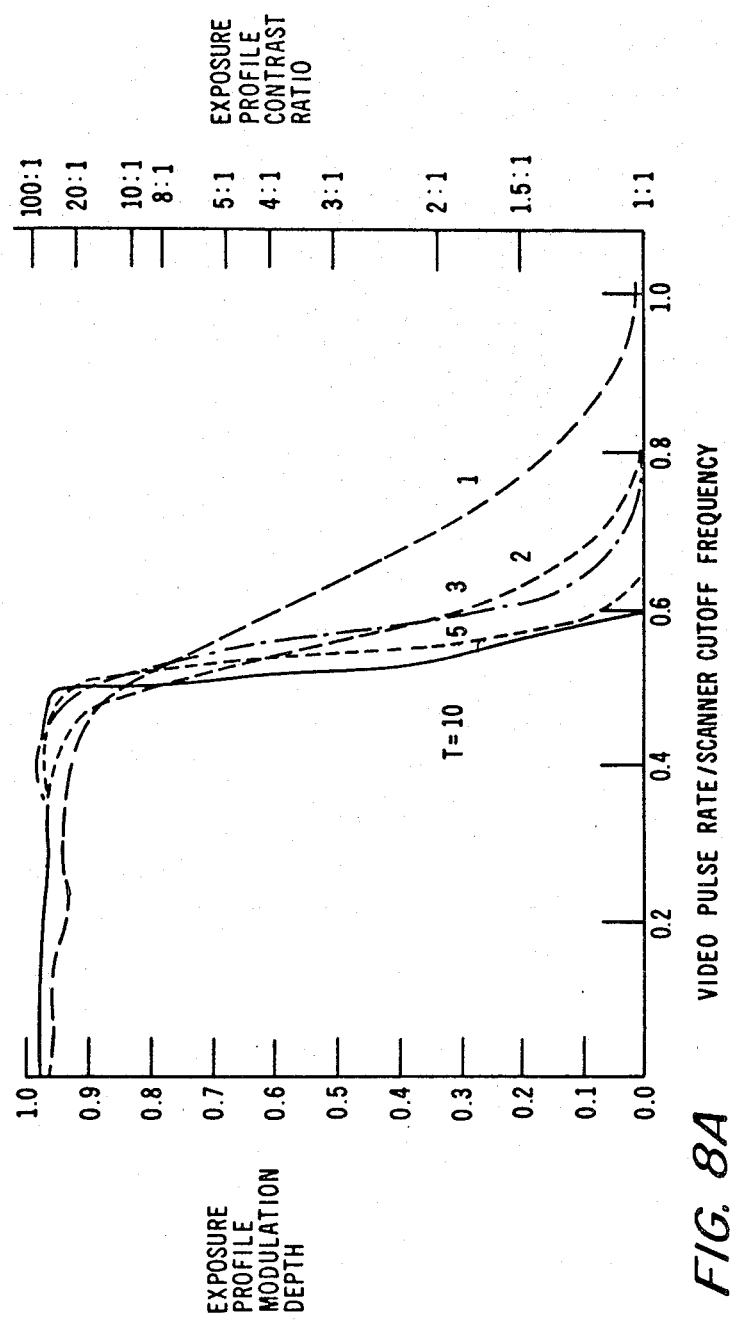
FIGS. 8A and 8B are the Sayce responses of standard pulse imaging and pulse imaging of the present invention, respectively.
Figure 8B:
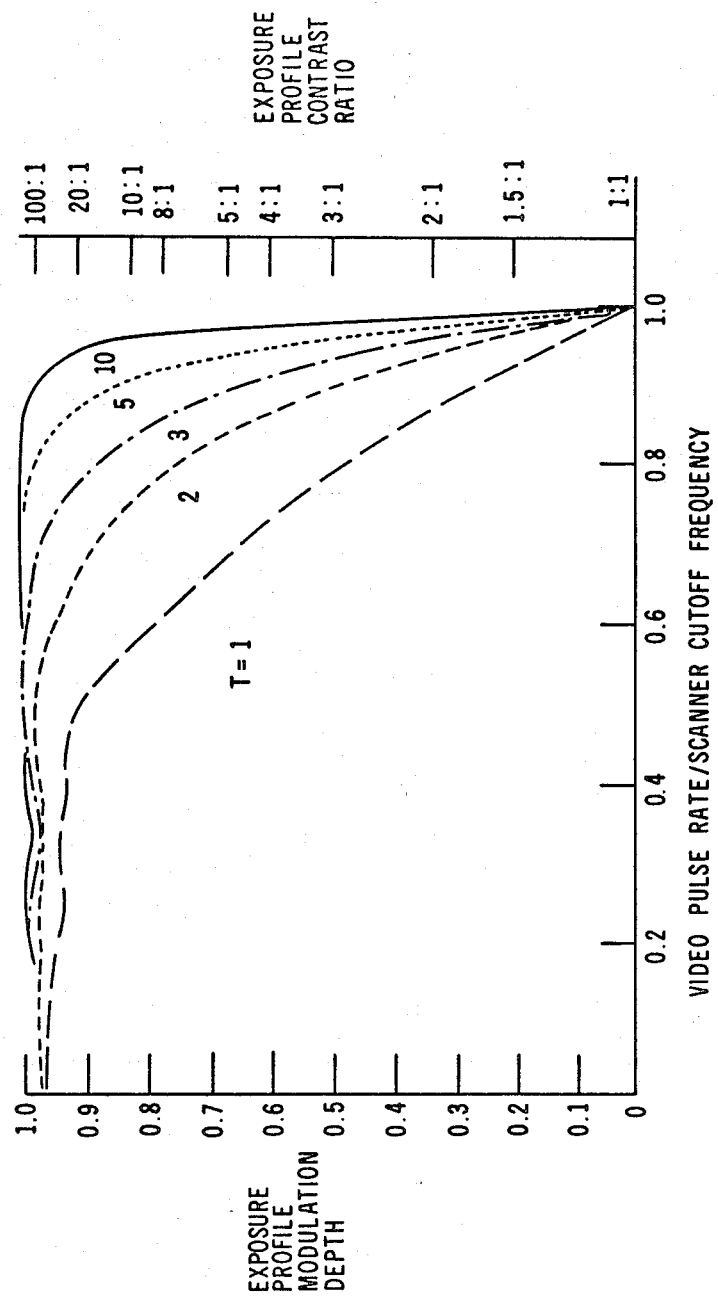

FIG. 8 compares the Sayce response (contrast ratio of the optical exposure profile which is imaged by the ROS in response to a square pulse video train as a function of the pulse repetition rate) of the standard pulse imaging (FIG. 8(a)) and pulse imaging ROS configuration of the present invention (FIG. 8(b)) for various values of the truncation ratio T wherein $$T = \frac{\text{polygon facet aperture width}}{\text{light beam diameter at photoreceptor}}$$

From FIG. 8(b), it is seen that the best resolution performance for the polarity reversal scheme occurs for an extreme Scophony configuration (i.e., high truncation ratio). In an extreme Scophony configuration, the laser beam illuminates a sizeable portion of the video signal stream within the modulator; e.g., 10 video bits or so.

Figure 9:
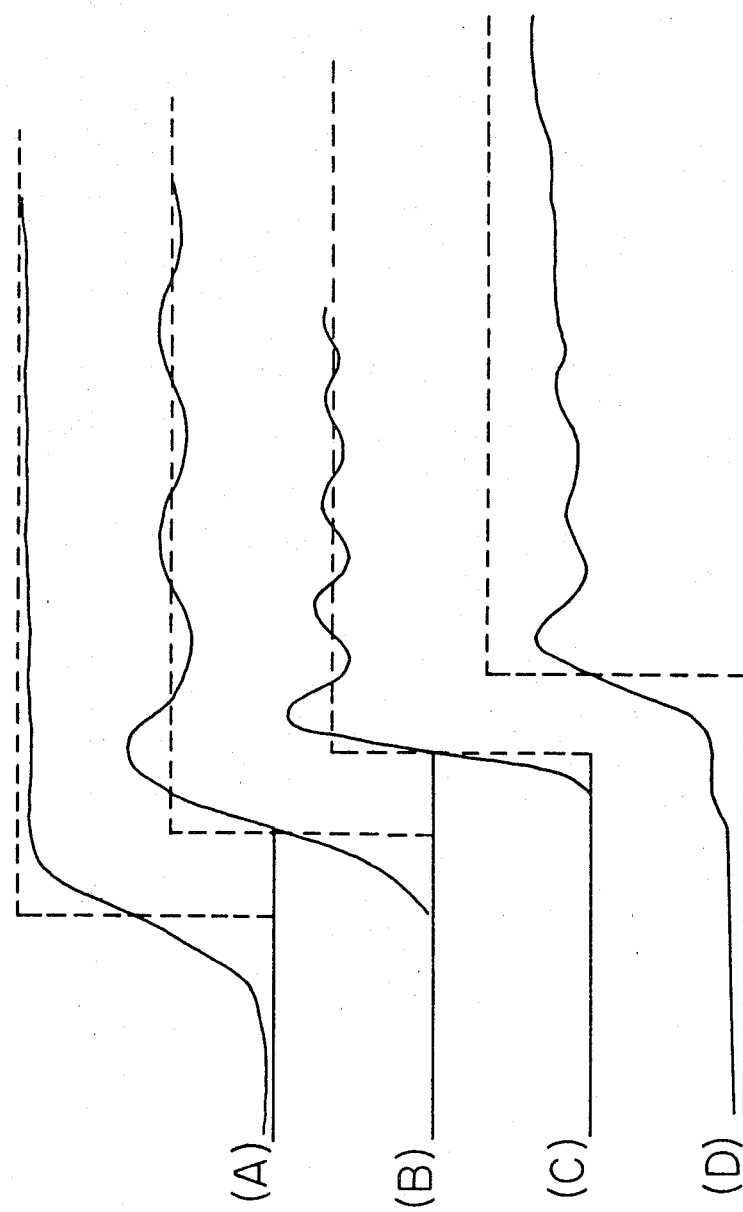
FIG. 9A to 9D show the edge profile responses of the various ROS configurations.

Another measure of resolution performance is edge spread which is defined as the physical distance across the photoreceptor as measured between 10% and 90% points of the exposure profile. The edge spread performance of the four alternative ROS configurations is compared in FIG. 9, the configuration with electronic predistortion providing the best results as shown in FIG. 9(c). FIG. 9(a) corresponds to curve 60 of FIG. 5, FIG. 9(b) corresponds to curve 62, FIG. 9(c) corresponds to curve 66 and FIG. 9(d) corresponds to curve 64.

The exposure profile of an extreme Scophony ROS configuration, as evident in FIGS. 9(b)–(d), shows ripples. Although the ripple effect for the pulse polarity reversing scheme is somewhat greater than the uniform polarity configuration, this ripple, if it provides to be too objectionable, can be eliminated by shading the ROS frequency response by electronically filtering (linear process in which higher frequency components of the video signal are suppressed using a 90° phase shift network to smooth the ripples in the exposure profile) the video signal to smooth the sharp transitions, although such shading may increase the edge spread.

The proposed modulator driver signal processing technique is simple and inexpensive to implement (especially when compared to the earlier mentioned Power's algorithm) and it enables a substantial improvement in ROS resolution, as measured by the Sayce response. Because of this substantial resolution improvement, the size of the polygon scanner can be reduced, lens aberrations are reduced and the acoustic carrier frequency sweep interval required for the facet tracking technique described in U.S. Pat. No. 4,170,028 is reduced. Further, the proposed technique, in combination with standard electrode phased array configurations, enables a glass A/O modulator to be extended into performance regimes which heretofore were available only with the more costly crystal A/O modulators, such as a $TeO_2$ modulator; i.e., a frequency of carrier oscillator 54 in the range from about 25 MHz to about 150 MHz.

FIGS. 10(a)–10(d) illustrate one embodiment of a circuit for providing phase reversal of the acoustic carrier frequency for successive video pulses.

When a balanced mixer 56 is used as an RF carrier modulator, the polarity of the modulating signal on lead 57 determines the phase of the output modulated carrier at terminal 59. A positive applied voltage causes a phase reversal of 180° in the modulated carrier with respect to the modulated carrier generated by a negative modulation voltage applied to lead 57. However, by modifying the balanced mixer 56 in the manner shown in FIG.

Figure 7:
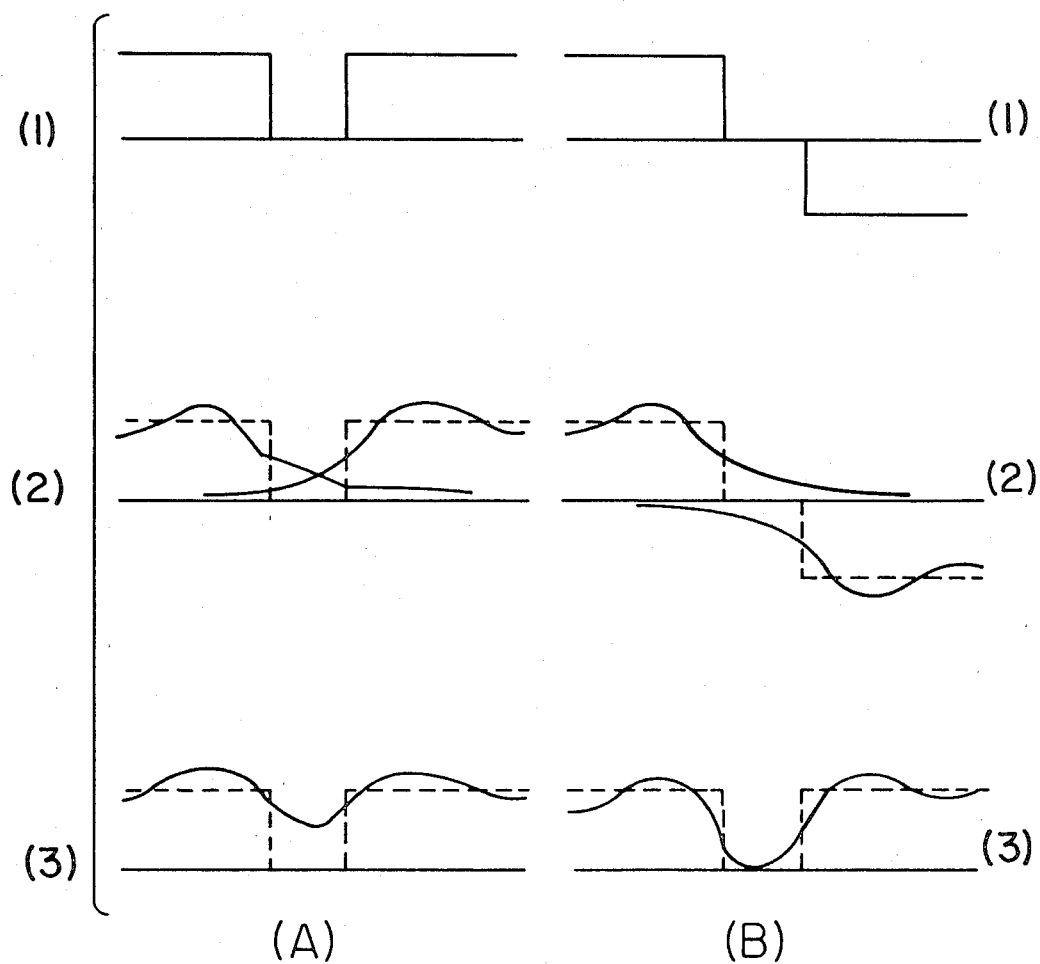

10(a), alternating pulses of the same polarity may be applied as the modulation signal on lead 57, causing phase reversal with every other video pulse. This technique is preferred since in digital circuit applications pulses (or bits) of the same polarity are utilized during processing. However, the previous discussion with respect to FIGS. 6 and 7 is still applicable since the resultant modulated RF outputs are equivalent.

The circuit consists of a pulse selector chip 80 (for example, chip SN 74157N sold by Texas Instruments Corporation) and a flip-flop 82 (chip SN 74103N, also sold by Texas Instruments Corporation) driving a balanced-mixer 56 (for example, Model MD 108 sold by Anzac Corporation) used as an RF carrier modulator. The flip-flop 82 changes state with every incoming video pulse. The pulse-selector 80 channels the pulses alternately to the 0° (contact C) or 180° (contact D) phase input of the balanced mixer 56. Thus, every modulated carrier output burst at terminal 59 is 180° out of phase with the previous burst.

The circuit operation in somewhat more detail is as follows:

The video input 100, in the form of a digital bit stream (only three bits 102, 104 and 106 are shown for the purposes of illustration) is applied to both pulse selector 80 and flip-flop 82. It is assumed that bit 102 causes the Q output of flip-flop 82 to go high (logic "1") which in turn causes the same pulse 102 to pass through pulse selector 80 and appear on lead 57. Correspondingly, the output on lead 61 is caused to go low (logic "0"). It should be noted that pulse selector 80 has an appropriate delay associated therewith to allow flip-flop 82 to change states prior to the video bit being transmitted through pulse selector 80.

At this point in time, the potential at contact D is high with respect to the voltage at contact C. In this situation, the windings of transformers T1 and T2 (the top winding of T1 is connected to the bottom winding of T2) and the voltage polarities across the anode-cathodes of diodes 110, 112, 114 and 116 are conditioned in a manner (diodes 110 and 114 conduct, diodes 112 and 116 being backbiased and non-conducting) such that the carrier is transmitted through mixer 56 whereby the output at terminal 59 is phase inverted as shown in FIG. 10(b). When the second video bit 104 is received, flip-flop 82 charges state to logic "0", the output of lead 57 goes to logic "0" and the video pulse 104 appears on lead 61. In this situation, the windings of transformers T1 and T2 (the top winding of T1 is connected to the top winding of T2) and the voltage polarities across the anode-cathodes of diodes 110, 112, 114 and 116 (diodes 112 and 116 conduct, diodes 110 and 114 being backbiased and non-conducting) are such that the RF carrier input is transmitted through mixer 56 so that the carrier appearing at the output at terminal 59 is neither phase inverted or phase delayed (180° out of phase with the previous output shown in FIG. 10(b)), as shown in FIG. 10(c). When the third video pulse 106 is received, the flip-flop changes state so that the output at Q is a logic "1" and the video pulse 106 appears on lead 57. In this case, and as set forth with respect to pulse 102, the output at terminal 59 is phase inverted and delayed as illustrated in FIG. 10(d) and is 180° out of phase from the previous output shown in FIG. 10(c). The operation of the circuit for additional video pulses is identical.

In essence, a 180° phase reversal between two successive pulses (bits) separated by a minimum gap of one bit duration is provided. In the situation wherein the video information is to be recorded on a xerographic medium, as shown, for example, in U.S. Pat. No. 4,170,028, and if the photoreceptor utilized therein requires a smooth exposure profile, electronic filtering may be required as set forth hereinabove.

While the invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings. For example, although the invention has been described as utilizing a scanning polygon to deflect the laser beam, other deflectors such as, for example, a galvanometer mirror, can be used instead.

What is claimed is:

1. An optical data recording system for high optical resolution information recording on a light sensitive member comprising:

means for providing a beam of radiant energy; a Bragg diffraction light-sound interaction medium including a transducer coupled to an acoustic wave transmitting medium characterized by a predetermined acoustic wave propagation velocity; scanning means having at least one reflective surface positioned in the optical path of said beam for scanning said beam across said member by rotating said reflective surface a desired angle to impart the information content of said beam to said member; control circuit means for receiving a video bit stream, said video bit stream representing information to be recorded on said light sensitive member, the output of said control circuit being coupled to said transducer for propagating intensity-modulated acoustic waves in said medium at a predetermined velocity; means for projecting through said medium in a direction transverse to said acoustic waves said light beam to produce in said medium a moving image of information corresponding to said modulating signal, said image moving at said predetermined velocity; and optical means interposed in the path of said intensity modulated beam and having magnification M associated therewith, said moving image being projected onto said scanned member within the envelope of said beam in a manner such that the velocity of said moving image is substantially equal to and in an opposite direction as the velocity of said scanning beam, the direction of movement of said beam and said image being substantially orthogonal to the direction of rotation of said medium, wherein the improvement is characterized by:

said control circuit means comprising pulse polarity reverse logic circuit means for reversing the voltage polarity of alternate bits in the received video bit stream to thereby increase the resolution of the intensity-modulated beam as recorded on said light sensitive member.

2. The optical data recording system as defined in claim 1 wherein said medium comprises a rotating xerographic member and said scanning means comprises a rotating polygon for scanning said moving image and beam across said medium in a direction orthogonal to the direction of rotation of said medium.

3. The optical data recording system as defined in claim 1 wherein the magnification M is selected such that M is substantially equal to $V_3/V_1$ wherein M is the system magnification between the interaction medium and said member, $V_3$ is the velocity of said scanned light beam and $V_1$ is said predetermined velocity.

4. The optical data recording system as defined in claim 3 wherein the magnification M is the magnification in a direction parallel to the direction of scan.

5. The optical data recording system as defined in claim 1 wherein said control circuit comprises an oscillator, the frequency of said oscillator being in the range from about 25 MHz to about 150 MHz.

6. The optical data recording system as defined in claim 5 wherein said medium comprises glass.

7. An optical data recording system for high optical resolution information recording on a light sensitive member comprising means for providing a beam of radiant energy; a Bragg diffraction light-sound interaction medium including a transducer coupled to an acoustic wave transmitting medium characterized by a predetermined acoustic wave propagation velocity; control circuit means for receiving a video bit stream, said video bit stream representing information to be recorded on said light sensitive member, the output of said control circuit being coupled to said transducer for propagating intensity-modulated acoustic waves in said medium at a predetermined velocity; means for projecting through said medium in a direction transverse to said acoustic waves said light beam to produce in said medium a moving image of information corresponding to said modulating signal, said image moving at said predetermined velocity; and optical means interposed in the path of said intensity modulated beam and having magnification M associated therewith, said moving image being projected onto discrete areas of said member within the envelope of said beam in a manner such that the velocity of said moving image is substantially equal to and in the same direction as the tangential component of motion of said discrete areas of said member, wherein the improvement is characterized by said control circuit means comprising:

pulse polarity reverse logic circuit means for reversing the voltage polarity of alternate bits in the received video bit stream, to thereby increase the resolution of the intensity-modulated beam as recorded on said light sensitive member.

8. The optical recording system as defined in claim 7 wherein said member comprises a rotating optical disc.

9. The optical recording system as defined in claim 8 wherein the magnification M is selected such that M is substantially equal to $V_3/V_1$ wherein M is the system magnification between the medium and said rotating member, $V_3$ is said tangential velocity and $V_1$ is said predetermined velocity.

10. The optical data recording system as defined in claim 7 wherein said control circuit comprises an oscillator, the frequency of said oscillator being in the range from about 25 MHz to about 150 MHz.

11. The optical data recording system as defined in claim 10 wherein said medium comprises glass.

* * * * *